(12) United States Patent
Prevoir et al.

(10) Patent No.: US 10,531,174 B2
(45) Date of Patent: Jan. 7, 2020

(54) EARPIECE EMPLOYING COOLING AND SENSATION INDUCING MATERIALS

(71) Applicant: Bose Corporation, Framingham, MA (US)

(72) Inventors: Shawn J. Prevoir, Northborough, MA (US); Agota F. Fehervari, Lexington, MA (US); Christopher B. Ickler, Sudbury, MA (US); Han Zhang, Shrewsbury, MA (US); Andrew D. Dominijanni, Newton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/292,308

(22) Filed: Oct. 13, 2016

(65) Prior Publication Data

US 2018/0109861 A1    Apr. 19, 2018

(51) Int. Cl.
*C08K 5/09* (2006.01)
*H04R 1/10* (2006.01)
(Continued)

(52) U.S. Cl.
CPC ............ *H04R 1/1016* (2013.01); *C08K 5/01* (2013.01); *C08K 5/06* (2013.01); *C08K 5/09* (2013.01);
(Continued)

(58) Field of Classification Search
CPC ........ C09K 5/063; C09K 5/06; H04R 1/1016; H04R 1/10; H04R 25/00; H04R 1/105; H04R 1/1091; H04R 25/02; A62B 18/025; A62B 18/02; A62B 18/00; A62B 18/18; G01K 7/20; C07C 69/73; C07C 69/734; C08K 5/01; C08K 5/06; C08K 5/09; C08K 9/10
USPC .......... 128/206.24; 136/259; 204/192.15; 347/103; 381/309, 312, 370, 371, 374, 381/72, 380, 328; 428/35.2, 156, 402, 428/327, 411.1; 521/122; 606/18, 37, 606/139; 19/144; 36/44; 252/67; 427/340, 384; 501/105; 502/439;
(Continued)

(56) References Cited

U.S. PATENT DOCUMENTS 4,989,271 A    2/1991    Sapiejewski et al.
6,295,366 B1 *  9/2001    Haller .................. H04R 5/0335
                                                    379/430
(Continued)

FOREIGN PATENT DOCUMENTS

EP    2 709 379    3/2014
JP    2001 309478    11/2001
(Continued)

OTHER PUBLICATIONS

International Search Report & Written Opinion; PCT/US2017/056051; dated Jan. 17, 2018; 14 pages.
(Continued)

*Primary Examiner* — Gerald Gauthier
(74) *Attorney, Agent, or Firm* — Fish & Richardson P.C.

(57) ABSTRACT

The disclosure is related to compositions having an elastomer and phase change materials, materials having an ability to provide one or more sensations upon contact with a person's skin, or a combination thereof. The compositions are suitable for use in earpieces such as in-ear earpieces.

25 Claims, 4 Drawing Sheets

(51) Int. Cl.
  *C08K 5/01* (2006.01)
  *C08K 5/06* (2006.01)
  *C08K 9/10* (2006.01)
  *C09K 5/06* (2006.01)
(52) U.S. Cl.
  CPC ............. *C08K 9/10* (2013.01); *C09K 5/063* (2013.01); *H04R 1/1091* (2013.01); *H04R 1/105* (2013.01)
(58) Field of Classification Search
  USPC ..... 514/738; 600/18, 37, 300, 301; 181/129; 623/10; 424/49; 442/327; 607/99, 109, 607/112, 113
  See application file for complete search history.

(56) References Cited

U.S. PATENT DOCUMENTS

| | | | |
|---|---|---|---|
| 6,319,599 B1 | 11/2001 | Buckely | |
| 6,856,690 B1 * | 2/2005 | Skulley | H04R 1/1008 381/367 |
| 7,703,572 B2 | 4/2010 | Du | A61F 11/14 181/129 |
| D645,458 S * | 9/2011 | Silvestri | H04R 1/1016 D14/223 |
| RE43,939 E | 1/2013 | Sapiejewski et al. | |
| 8,355,522 B2 | 1/2013 | Annunziato | H04R 1/2842 181/129 |
| 8,374,373 B2 | 2/2013 | Sapiejewski et al. | |
| 8,746,397 B2 * | 6/2014 | Peskar | G10K 11/168 181/129 |
| 9,462,366 B2 * | 10/2016 | Silvestri | H04R 1/1016 |
| D794,613 S * | 8/2017 | Hayden | D14/223 |
| 9,744,074 B2 * | 8/2017 | Rogers | A61F 7/12 |
| 2002/0013212 A1 * | 1/2002 | Boussant-Roux | C03B 5/237 501/105 |
| 2003/0078471 A1 * | 4/2003 | Foley | A61B 17/02 600/37 |
| 2004/0143153 A1 * | 7/2004 | Sharrow | A61B 17/02 600/37 |
| 2004/0230090 A1 * | 11/2004 | Hegde | A61M 1/1053 600/18 |
| 2004/0265495 A1 * | 12/2004 | Freuler | C08K 3/04 427/384 |
| 2005/0089185 A1 | 4/2005 | Allen | |
| 2006/0233986 A1 * | 10/2006 | Gutsche | C09K 5/063 428/35.2 |
| 2006/0238593 A1 * | 10/2006 | Kohne | B41J 2/0057 347/103 |
| 2006/0276334 A1 * | 12/2006 | Balduf | B01J 19/249 502/439 |
| 2007/0089276 A1 * | 4/2007 | Dugan | D01F 1/10 19/144 |
| 2008/0145663 A1 * | 6/2008 | Amundson | A61K 8/0208 428/411.1 |
| 2008/0146890 A1 * | 6/2008 | LeBoeuf | A61B 5/0059 600/300 |
| 2008/0181441 A1 * | 7/2008 | Smith | H04R 1/1016 381/328 |
| 2008/0193653 A1 * | 8/2008 | Oh | B01J 13/14 427/340 |
| 2008/0230373 A1 * | 9/2008 | Kim | C23C 14/0623 204/192.15 |
| 2008/0247561 A1 * | 10/2008 | Smith | H04R 1/1075 381/72 |
| 2009/0024143 A1 * | 1/2009 | Crews | A61B 17/0643 606/139 |
| 2010/0119076 A1 | 5/2010 | Monk et al. | |
| 2010/0158301 A1 | 6/2010 | Kuhtz et al. | |
| 2010/0215198 A1 * | 8/2010 | Ngia | H04R 1/1016 381/309 |
| 2010/0280529 A1 * | 11/2010 | Crews | A61B 17/29 606/139 |
| 2011/0002475 A1 | 1/2011 | Kimura | |
| 2011/0072685 A1 * | 3/2011 | Gutowsky, Jr. | A43B 7/142 36/44 |
| 2011/0125238 A1 * | 5/2011 | Nofzinger | A61F 7/10 607/109 |
| 2011/0193008 A1 * | 8/2011 | Fieback | C09K 5/063 252/67 |
| 2011/0313498 A1 * | 12/2011 | Rogers | A61F 7/007 607/112 |
| 2012/0294465 A1 * | 11/2012 | Vlach | H04R 25/554 381/312 |
| 2012/0316624 A1 * | 12/2012 | Smith | A61F 7/007 607/99 |
| 2013/0087404 A1 | 4/2013 | Peskar et al. | |
| 2013/0123919 A1 * | 5/2013 | Goldstein | A61F 2/18 623/10 |
| 2013/0136704 A1 * | 5/2013 | Komatsuki | A61K 8/345 424/49 |
| 2013/0238065 A1 | 9/2013 | Rao | |
| 2013/0296449 A1 * | 11/2013 | Peterson | C08J 9/0009 521/122 |
| 2013/0298991 A1 * | 11/2013 | Parker | C09K 5/02 136/259 |
| 2013/0310907 A1 * | 11/2013 | Rogers | A61F 7/007 607/113 |
| 2014/0079270 A1 | 3/2014 | Essabar et al. | |
| 2014/0349075 A1 * | 11/2014 | Hendriks | B29C 37/0053 428/156 |
| 2015/0013682 A1 * | 1/2015 | Hendriks | A61M 16/06 128/206.24 |
| 2015/0036861 A1 * | 2/2015 | Cotha | H04R 1/1058 381/380 |
| 2015/0272850 A1 * | 10/2015 | Yoneto | A61K 8/735 514/738 |
| 2015/0358712 A1 | 12/2015 | Ji | |
| 2016/0021449 A1 | 1/2016 | Litovsky et al. | |
| 2016/0120474 A1 * | 5/2016 | Connor | A61B 5/6817 600/301 |
| 2016/0123009 A1 * | 5/2016 | Ayambem | C09K 5/063 428/327 |
| 2016/0168439 A1 * | 6/2016 | Ayambem | C09K 5/063 428/402 |
| 2016/0200882 A1 * | 7/2016 | Bhat | F41H 5/0471 442/327 |
| 2016/0223269 A1 | 8/2016 | Hartmann et al. | |
| 2016/0230000 A1 | 8/2016 | Gu | |
| 2017/0211992 A1 * | 7/2017 | Yeager | G01K 7/20 |
| 2017/0226395 A1 * | 8/2017 | Sutterlin | C09K 5/063 |
| 2017/0252534 A1 * | 9/2017 | Nofzinger | A61H 9/0007 |
| 2018/0054667 A1 * | 2/2018 | Yamkovoy | H04R 1/1041 |
| 2019/0169111 A1 * | 6/2019 | Dickerson | C07C 69/734 |

FOREIGN PATENT DOCUMENTS

| | | |
|---|---|---|
| WO | WO 1993/25053 | 12/1993 |
| WO | WO 2007/027670 | 3/2007 |
| WO | WO 2013/016336 | 1/2013 |
| WO | WO 2016/011063 | 1/2016 |
| WO | WO 2016/130631 | 8/2016 |

OTHER PUBLICATIONS

International Search Report & Written Opinion; PCT/US2017/056058; dated Dec. 7, 2017; 14 pages.

\* cited by examiner

TIP IS FILLED

BODY IS FILLED

EARPIECE EMPLOYING COOLING AND SENSATION INDUCING MATERIALS

TECHNICAL FIELD

This disclosure generally relates to compositions that are useful for earpieces for use with electronic devices.

BACKGROUND

Earpieces can be e.g., part of earphones and other devices placed within human ears to deliver sound to the ears.

SUMMARY

In one aspect, described herein are examples of compositions that include E1, which is an elastomer; and one or more phase change materials having a phase change ability from solid to liquid state at a predetermined phase-change temperature; where the composition has a hardness of about 5 Shore A to about 50 Shore A, and the amount of the phase change material in the composition is about 10% to about 40% by weight.

In some implementations, the composition has a hardness of about 10 Shore A to about 20 Shore A. The amount of phase change material in the composition is about 25% to about 35% by weight.

In some implementations, the phase change material includes one or more C1 compounds enclosed in microspheres. C1 can be a saturated hydrocarbon, a fatty acid, or a polyether. C1 can be a saturated hydrocarbon. C1 can be an n-alkane such as heptadecane, octadecane, nonadecane, icosane, or henicosane. C1 can be octadecane or isosane.

In some implementations, E1 is a thermoset rubber, thermoplastic elastomer, or a combination thereof. E1 can be a silicone rubber.

In some implementations, the phase-change temperature is about 25° C. to about 35° C. In some implementations, the composition includes two phase change materials having a phase change ability from solid to liquid state at different phase-change temperatures.

In another aspect, the compositions described above further include one or more C2, which is a material having an ability to provide one or more sensations upon contact with a person's skin. In some implementations, the sensation is cooling, tingling, numbing, or soothing.

In another aspect, described herein are examples of compositions that include E2, which is an elastomer; and one or more C3, which is a material having an ability to provide one or more sensations upon contact with a person's skin; and the composition has a hardness of about 5 Shore A to about 50 Shore A. The sensation includes cooling, warming, tingling, numbing, or soothing.

In another aspect, described herein are examples of compositions that include E3, which is an elastomer; and one or more phase change materials having a phase change ability from solid to liquid state at a predetermined phase-change temperature; where the amount of the phase change material in the composition is about 40% to about 70% by weight. In some implementations, the amount of phase change material in the composition is about 50% to about 60% by weight.

In another aspect, described herein are examples of earpieces having one or more components made from one or more compositions described herein.

In some implementations, an earpiece has tip, retaining legs, body, channel, or a combination thereof made from the composition that includes E1 as described herein. A composition that includes E2 as described herein or a composition that includes E3 as described herein is filled behind the tip.

In some implementations, an earpiece has tip, retaining legs, body, channel, or a combination thereof made from the composition that includes E1 as described herein, where such composition further includes one or more C2, which is a material having an ability to provide one or more sensations upon contact with a person's skin. A composition that includes E3 as described herein is filled behind the tip.

In some implementations, an earpiece has tip, retaining legs, body, channel, or a combination thereof made from the composition that includes E2 as described herein. A composition that includes E3 as described herein is filled behind the tip.

In some implementations, an earpiece has tip, retaining legs, body, channel, or combination thereof made from an elastomer, and behind the tip is filled with a composition that includes E2 as described herein.

In some implementations, an earpiece has tip, retaining legs, body, channel, or a combination thereof made from a first composition that includes E2 as described herein, where behind the tip is filled with a second composition that includes E2 as described herein and the C3 material in the first and second compositions is the same or different.

Figure 3:
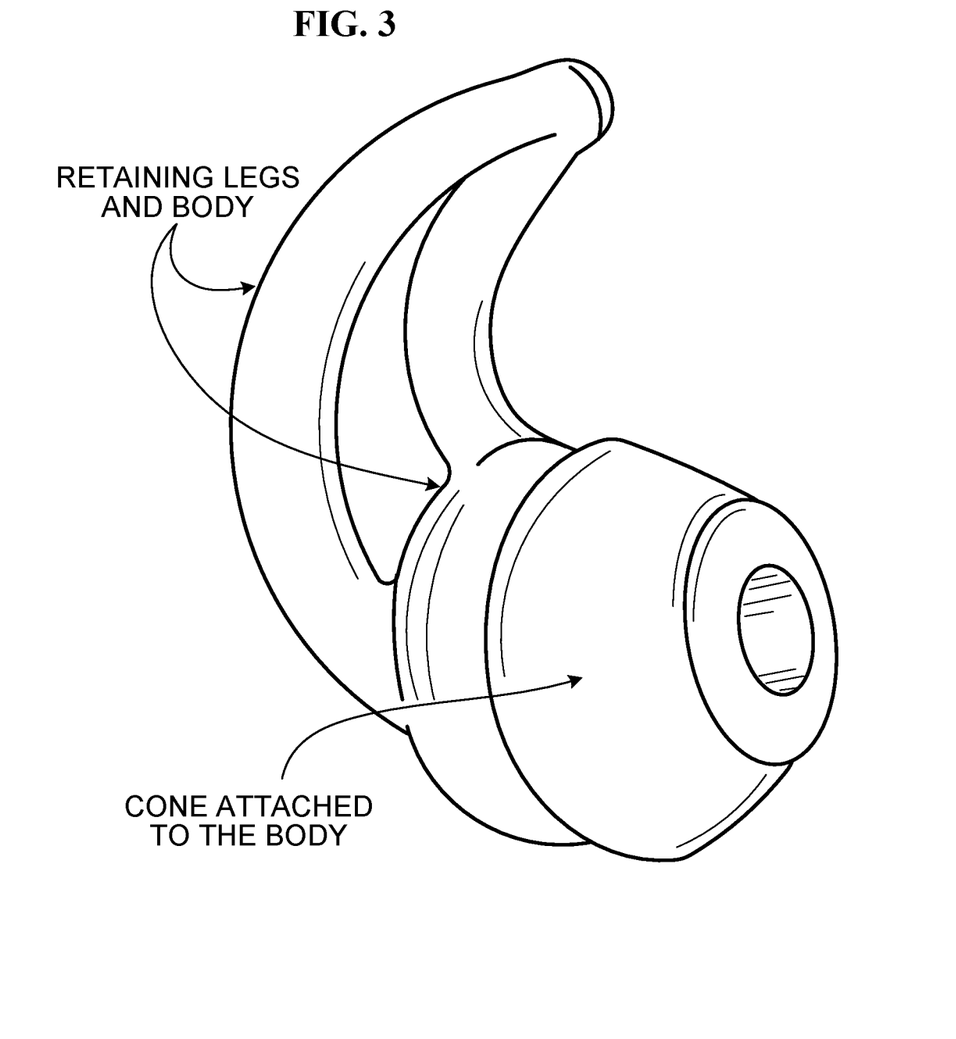
FIG. 3 shows an example of an earpiece with a cone replacing the tip.

In some implementations, an earpiece has retaining legs, body, channel, or a combination thereof made from a composition that includes E1 as described herein and a cone made from and filled with a composition that includes E3; where the cone is attached to the body of the earpiece substantially as shown in FIG. 3.

In some implementations, an earpiece has retaining legs, body, channel, or a combination thereof made from a first composition that includes E1 as described herein, and a cone made from and filled with a second composition that includes E1 as described herein; where the predetermined phase-change temperature of the first composition is about 32° C., the predetermined phase-change temperature of the second composition is about 28° C., and the cone is attached to the body of the earpiece substantially as shown in FIG. 3.

In some implementations, an earpiece has tip, retaining legs, body, channel, or a combination thereof made from a composition that includes E1, which is an elastomer; and one or more phase change materials having a phase change ability from solid to liquid state at a predetermined phase-change temperature; where the composition has a hardness of about 5 Shore A to about 50 Shore A, and the amount of the phase change material in the composition is about 10% to about 40% by weight. In some implementations, a headphone includes an earpiece described herein.

In some implementations, an earpiece that includes tip, retaining legs, body, and channel, can have its tip (e.g., behind the tip) filled with a gel.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

DETAILED DESCRIPTION

Figure 1:
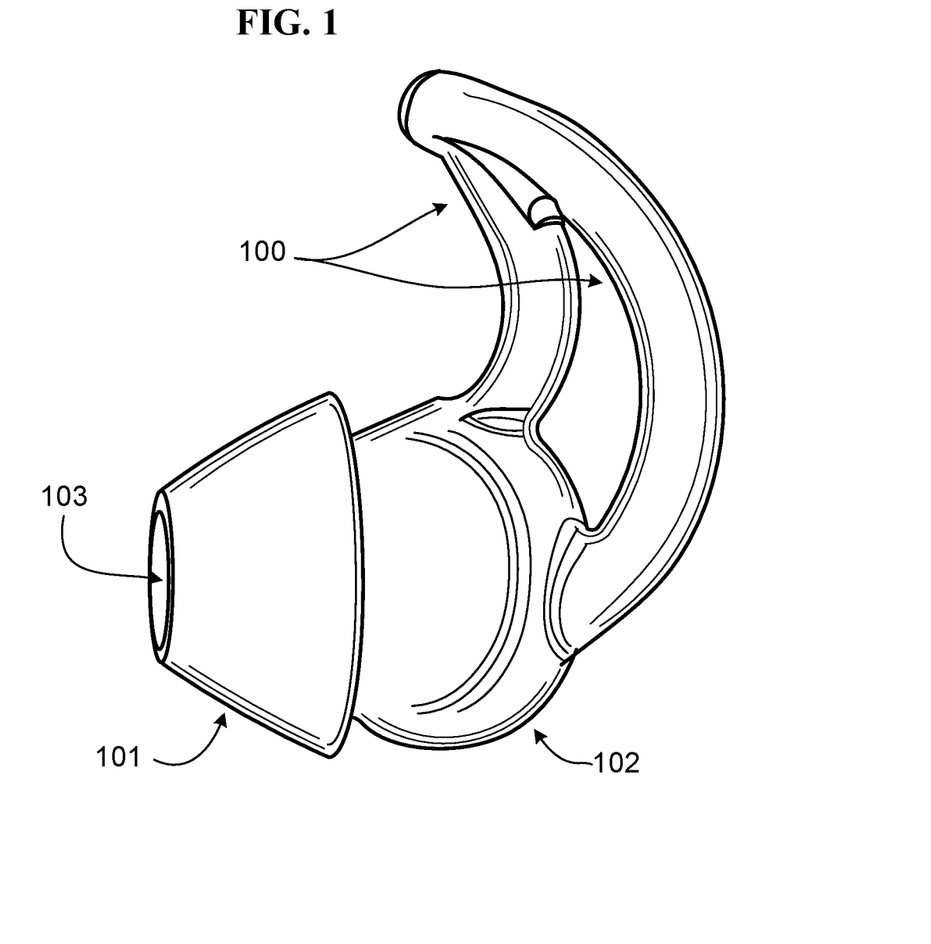
FIG. 1 shows an example of an earpiece.
Figure 4:
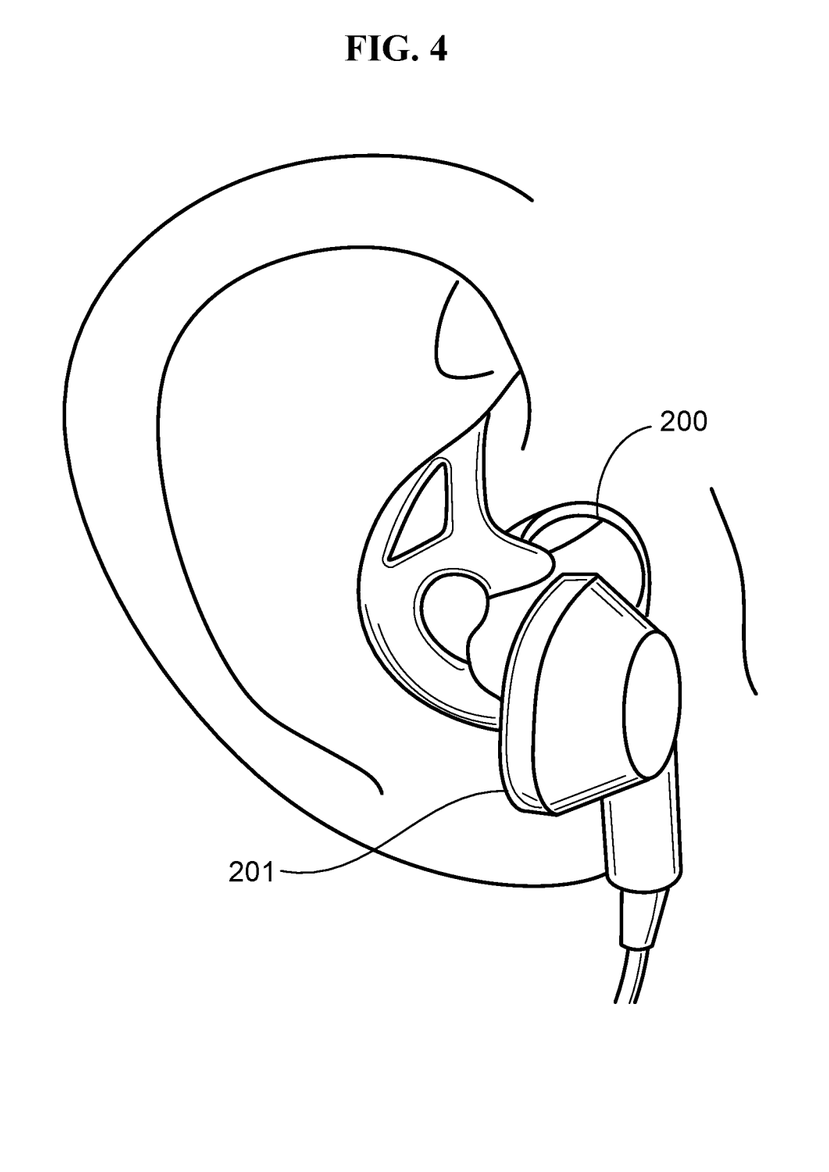
FIG. 4 shows an example of a headphone with an earpiece.

The present disclosure describes compositions that are useful for preparing earpieces. Typically, an earpiece includes a tip that fits into the ear canal, and a retaining structure that is configured to hold the tip in place. FIG. 1 provides an exemplary earpiece showing retaining legs 100, tip 101, body 102, and a channel 103 that allows for conducting sound waves. The retaining legs are optional. An earpiece can be configured to be part of a headphone, which typically includes, at minimum, an acoustic driver module. FIG. 4 shows an example of a headphone with an earpiece 200 and acoustic driver module 201. Some earpieces may be connected to an audio generation device wirelessly via a BLUETOOTH® transceiver installed within the earpiece. Some earpieces may serve as passive earplugs that lack any connections or acoustic features. Wearing earpieces can cause discomfort due to build-up of in-ear pressure, heat, moisture, etc. The present disclosure describes earpieces made from compositions that can reduce discomfort to the wearer. As described herein, the left and right earpieces may mirror each other, but have the same structure and function, or a symmetric earpiece may fit either ear.

The disclosure describes a composition including E1, which is an elastomer, and one or more phase change materials having a phase change ability from solid to liquid state at a phase-change temperature; where the composition has a hardness of about 5 Shore A to about 50 Shore A, and the amount of the phase change material in the composition is about 10% to about 40% by weight. This composition is also referred to as composition 1. The phase change material can absorb heat as temperature rises by using the heat energy to melt the solid to liquid. As the temperature cools, the phase change material releases the heat and changes back to a solid. The phase change material can regulate an earpiece wearer's temperature and thus, reduce the discomfort due to heat and pressure.

Earpieces made from compositions that are too hard can be uncomfortable for the wearer. Earpieces that are too soft may lack shape and can be difficult to handle. As the amount of phase change material increases in the composition, the hardness of the composition can increase. The hardnesses of the compositions described herein are within certain ranges that can provide comfort while maintaining their shape and cooling effect. In certain examples, composition 1 has a hardness of about 5 to about 50 Shore A, about 5 to about 40 Shore A, about 5 to about 30 Shore A, about 5 to about 20 Shore A, or about 10 to about 20 Shore A. Composition 1 can have a hardness of about 10 to about 20 Shore A or about 10 to about 15 Shore A, for example, about 15 Shore A or about 12 Shore A.

The phase change material can be present in composition 1 in the amount of about 10% to about 40%, about 10% to about 30%, or about 20% to about 30% by weight. The amount can be about 25% to about 35% by weight, e.g., about 25% by weight.

The phase change material can include one or more C1 compounds. C1 is generally enclosed in microspheres such that when the compound undergoes phase change to the liquid state, the liquid is contained in the microspheres and does not flow away. The outer layer of the microspheres is typically a shell made from a polymer. Examples of C1 include saturated hydrocarbons (e.g., n-alkane), fatty acids (e.g., carboxylic acid with an aliphatic chain), or polyethers. For instance, C1 can be a saturated hydrocarbon such as n-alkane. Examples of n-alkanes include, but not limited to, compounds having fourteen carbons to forty carbons or fourteen to thirty-two carbons in chain length, e.g., tetradecane (melting point (mp) at about 5.5° C.), pentadecane (mp at about 9.9° C.), hexadecane (mp at about 18° C.), heptadecane (mp at about 21° C.), octadecane (mp at about 29° C.), nonadecane (mp at about 33° C.), icosane (mp at about 36.7° C.), henicosane (mp at about 40.5° C.), docosane (mp at about 42° C.), tricosane (mp at about 49° C.), tetracosane (mp at about 52° C.), pentacosane (mp at about 54° C.), hexacosane (mp at about 56.4° C.), heptacosane (mp at about 59.5° C.), octacosane (mp at about 64.5° C.), nonacosane (mp at about 63.7° C.), triacontane (mp at about 65.8° C.), hentriacontane (mp at about 67.9° C.), and dotriacontane (mp at about 69° C.). In some examples, C1 is heptadecane, octadecane, nonadecane, icosane, or henicosane. For example, C1 is octadecane or isosane.

The phase change material can include one or more C1 compounds to achieve the desired predetermined temperature (also referred to as phase change temperature or melting point). For example, the material can include heptadecane, octadecane, nonadecane, icosane, henicosane, or a combination thereof. The material can include octadecane, isosane, or a combination thereof. In certain examples, the phase-change temperature that the phase change material change from solid to liquid or liquid to solid is at about 25° C. to about 35° C. The phase-change temperature can be about 28° C. or about 32° C. The amount of C1 in the phase change material can be greater than about 50%, about 60%, about 70%, about 80%, about 90%, or about 95% by weight.

An exemplary phase change material that has a melting point of about 28° C. includes about 3% of water, about 0.05% of formaldehyde, about 85% to about 90% of octadecane and about 10% to about 15% of shells enclosing these compounds. Another example of phase change material that has a melting point of about 32° C. includes about 3% of water, about 0.5% of formaldehyde, about 42% to about 45% of octadecane, about 42% to about 45% of eicosane, and about 10% to about 15% of shells enclosing these compounds.

Exemplary phase change materials include MPCM32 D and MPCM 28 from Microtek Laboratories Inc. (Dayton, Ohio) and EnFinit PCM 28CPS and Enfinit PCM 35CP from Encapsys, LLC. (Appleton, Wis.).

One or more phase change materials may be present in composition 1, where the phase change material can have different phase-change temperatures (e.g., melting point) changing from solid to liquid. For example, composition 1 can include a phase change material with a phase change ability that melts at the phase-change temperature at about 28° C. and another phase change material that melts at the phase-change temperature at about 32° C. The phase change material can be dispersed homogenously throughout E1 or heterogeneously, e.g., as aggregates in E1. When two or more phase change materials are present in the composition, the materials can also be dispersed homogenously throughout E1 or heterogeneously.

The E1 elastomer can be a thermoset rubber, thermoplastic elastomer, or a combination thereof. Examples of E1 includes thermoset urethanes, butyl rubbers, nitriles, thermoplastic vulcanizates such as EDPM (ethylene propylene diene monomer (M-class) rubber) in polypropylene or thermoplastic silicone vulcanizate (silicone and thermoplastic urethane). E1 can also be styrenic-based thermoplastic elastomers (e.g., styrene isoprene butadiene (SIBS), styrene butadiene styrene (SBS) and styrene ethylene butylene styrene (SEBS)), ethylene vinyl acetate, polynorbornene, and interpenetrating polymer networks. The E1 elastomer can be a silicone rubber. In certain implementations, the silicone rubber is a liquid injection molding silicone such as KE-1950-10A and KE2090-5A from Shin-Etsu Silicones of America, Inc. (Akron, Ohio). Exemplary silicone rubber can have a cure temperature of about 100° C. to about 150° C. (e.g., 120° C.). E1 can be POWERSIL® gel from Wacker Chemie AG. E1 can be Soma Foama 15 purchased from Smooth-On, Inc. (Macungie, Pa.).

The E1 elastomer such as silicone rubber can have a hardness of about 10 Shore A to about 20 Shore A (e.g., about 13 Shore A). Experimental data have shown that the addition of phase change material to the elastomer can result in a composition with a different hardness, e.g., the resulting composition can be harder than the elastomer alone. In some examples, the E1 elastomer can be softer than the resulting composition having E1 and the phase change material. The E1 elastomer can also include silicone rubber that have a shear modulus (G) of about 1500 to about 1700 kPa or about 1600 kPa and a tan delta value of greater than about 1, e.g., 1.1. For example, E1 can be POWERSIL® gel.

Composition 1 described herein can further include one or more C2, where C2 is a material having the ability to provide one or more sensations upon contact with a person's skin. This composition is also referred to as composition 2. The resulting composition may be suitable for controlled or delayed release of C2 such that the sensation provided by C2 would last over a longer period of time. The sensation can be cooling, tingling, numbing, soothing, etc. In certain examples, the C2 material can provide a cooling sensation upon contact with a person's skin and such C2 material includes compounds that are TRPM8 agonists. Examples of C2 include menthol (e.g., (−)-menthol), menthyl lactate, linalool, 1,8-cineole, α-bisabolol, icilin, oil derived from rosemary leaves, geraniol, hydroxy-citronellal, COOLACT® 10 and COOLACT® 38D from Vintage Specialty Ingredients, Inc., WS-3 (N-Ethyl-5-methyl-2-(1-methylethyl)cyclohexanecarboxamide), or a combination thereof. Other examples of C2 such eugenol (which can be found in clove oil) and benzocane that provide a numbing sensation can also be included in the composition. In certain implementations, the C2 material can have anti-inflammatory ability and thus, providing relief due to inflammation.

The disclosure also provides a composition including E2, which is an elastomer; and one or more C3, which is a material having the ability to provide one or more sensation upon contact with a person's skin; and the composition has a hardness of about 5 Shore A to about 50 Shore A. This composition is also referred to as composition 3. Composition 3 can be suitable for controlled or delayed release of C3. The sensation includes cooling, warming, tingling, numbing, soothing, etc. In certain examples, composition 3 has a hardness of about 5 to about 50 Shore A, about 5 to about 40 Shore A, about 5 to about 30 Shore A, about 5 to about 20 Shore A, or about 10 to about 20 Shore A. Composition 3 can have a hardness of about 10 to about 20 Shore A or about 10 to about 15 Shore A, for example, about 15 Shore A, or about 12 Shore A.

Exemplary C3 material includes those described for C2. In certain implementations, C3 can be a material that provides a warming sensation and such C3 material can include compounds that are TRPV1 agonists. Examples of C3 having the ability to provide a warming sensation include capsaicin, piperine, HOTACT® VBE from Vintage Specialty Ingredients, Inc., or a combination thereof. Exemplary E2 elastomer includes those described under E1 elastomer.

The disclosure also provides a composition including E3, which is an elastomer; and one or more phase change materials having a phase change ability from solid to liquid state at a phase-change temperature; where the amount of the phase change material in the composition is about 40% to about 70% by weight. This composition is also referred to as composition 4. The amount of phase change material in the composition can be about 50% to about 60% (e.g., about 50%, about 55%, or about 60%) by weight. The phase change material can include one or more C4 compounds enclosed in microspheres. Exemplary phase change materials and C4 compounds can include the implementations and examples described for composition 1. For example, C4 is octadecane or isosane. The E3 elastomer can include those described under E1 elastomer e.g., E3 is a thermoset rubber, thermoplastic elastomer, thermoplastic polyurethane, or a combination thereof. The E3 elastomer can also include silicone rubber that have a shear modulus (G) of about 1500 to about 1700 kPa or about 1600 kPa and a tan delta value of greater than about 1, e.g., 1.1. For example, E3 can be POWERSIL® gel. In some implementations, composition 4 can have a shear modulus of about 50,000 to about 100,000 or about 60,000 to about 80,000 and a tan delta value of less than 1, e.g., 0.8. The shear modulus values can be determined using an AR2000ex rheometer at room temperature, 0.1% oscillation strain and 1 Hz. The phase-change temperatures can be same as those described under composition 1, e.g., about 25° C. to about 35° C., about 28° C., or about 32° C. Composition 4 can further include C2, which is as described above.

An apparatus such as an earpiece (e.g., in-ear earpiece) can have one or more components (e.g., retaining legs, body, tip, and channel) made from one or more compositions described herein. For example, an earpiece can have one more components made from composition 1. An earpiece can have one or more components made from composition 2. An earpiece can have one or more components made from composition 3. An earpiece can have one or more components made from composition 4.

In some examples, the phase change material, C2, and C3 can be dispersed homogenously throughout the elastomer in the compositions described herein. Alternatively, the phase change material, C2 and C3 can prepared in a suitable form to be integrated into the earpieces after the earpieces have been fabricated from an elastomer. For example, suitable forms of phase change material, C2 and C3 can be filled behind the tip of the earpiece. The tip can serve as a diffusion barrier for e.g., C2 and C3.

Without being limited to certain combinations, an earpiece can have one or more components (e.g., retaining legs, body, tip, and channel) made from composition 1, one or more other components (e.g., retaining legs, body, tip, and channel) made from composition 2, composition 3, or composition 4. Alternatively, all components of the earpiece (e.g., retaining legs, body, tip, and channel) can be made from composition 1, composition 2, composition 3, or composition 4.

An earpiece that includes tip, retaining legs, body, and channel, can have its tip (e.g., behind the tip) filled with a gel. An earpiece can have one or more components (e.g., retaining legs, body, tip, and channel) made from a composition or an elastomer provided herein, and behind the tip of the earpiece can be filled with a material (e.g., a gel, a composition or an elastomer described herein). For example, behind the tip of an earpiece can be filled with an elastomer such as E1, E2, or E3.

Figure 2:
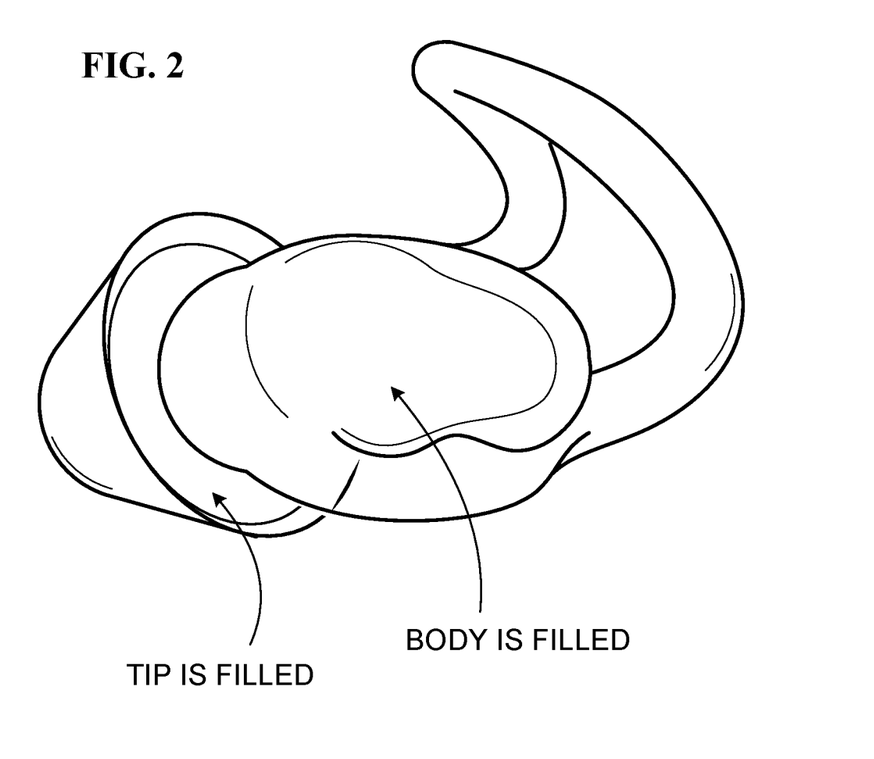
FIG. 2 shows an example of an earpiece filled with a composition described herein.

An earpiece can have one or more components (e.g., retaining legs, body, tip, and channel) made from a composition provided herein and the tip (e.g., behind the tip) and the body are filled with a composition provided herein. For example, FIG. 2 shows an example of an earpiece where behind the tip and the body are filled with a composition described herein. The earpiece can be made from composition 1 and the tip (e.g., behind the tip), the body, or both are filled with composition 1, composition 2, composition 3, composition 4, or a combination thereof. The earpiece can be made from composition 2 and the tip, the body, or both are filled with composition 1, composition 2, composition 3, composition 4, or a combination thereof. The earpiece can be made from composition 3 and the tip, the body, or both are filled with composition 1, composition 2, composition 3, composition 4, or a combination thereof.

An earpiece can have one or more components (e.g., retaining legs, body, tip, and channel) made from a composition provided herein and the tip (e.g., behind the tip) is filled with a composition provided herein. Behind the tip of an earpiece having one or more components (e.g., retaining legs, body, tip, and channel) made from a composition described herein (e.g., composition 1, composition 2, composition 3, or composition 4) can be filled with (i) composition 4, wherein E3 is POWERSIL®; (ii) a material having an ability to provide one or more sensations upon contact with a person's skin such as C2 and C3 as described herein; (iii) composition 3; or (iv) a combination of items (i) and (ii). In some examples, an earpiece has one or more components (e.g., retaining legs, body, tip, and channel) made from composition 1 and behind the tip is filled with composition 3. An earpiece can have one or more components (e.g., retaining legs, body, tip, and channel) made from composition 1 and behind the tip is filled with composition 4. An earpiece can have one or more components (e.g., retaining legs, body, tip, and channel) made from composition 2 and the tip is filled with composition 4. An earpiece can have one or more components (e.g., retaining legs, body, tip, and channel) made from composition 3 and behind the tip is filled with composition 4.

In some implementations, the earpiece can be made from a first composition 3 and the tip, the body, or both are filled with a second composition 3, where the first and second compositions can include the same C3 or different C3.

The earpiece can also be made from an elastomer such as E1, E2, or E3 as described herein (e.g., silicone rubber), where behind the tip of such an earpiece is filled with one or more compositions described herein e.g., composition 1, composition 2, composition 3 and composition 4. Behind the tip of an earpiece made from an elastomer such as E1, E2, or E3 as described herein (e.g., a silicone rubber) can be filled with (i) composition 4, wherein E3 is POWERSIL®; (ii) a material having an ability to provide one or more sensations upon contact with a person's skin such as C2 and C3 as described herein; (iii) composition 3; or (iv) a combination of items (i) and (ii).

Additional phase change material can be incorporated in an earpiece to improve the cooling effect. For example, the tip can be removed from the body at the channel location. A cone structure can be made from a composition including an elastomer (e.g., E1, E2, E3, and R4) and greater than about 40%, greater than about 50%, or greater than about 70% of phase change material (e.g., composition 4) and attached to the body of the earpiece as shown in FIG. 3. For example, the cone structure can be made from a foam (e.g., Soma Foama purchased from Smooth-On, Inc. (Macungie, Pa.)) or a composition including a foam and one or more phase change materials. For example, the retaining legs, body, and channel are made from composition 1, and the cone is made from and filled with composition 4, where the cone is attached to the body of the earpiece substantially as shown in FIG. 3. In another example, the retaining legs, body, and channel are made from a first composition 1 and the cone is made from and filled with a second composition 1, where the phase-change temperature of the first composition is about 32° C., the phase-change temperature of the second composition is about 28° C., and the cone is attached to the body of the earpiece substantially as shown in FIG. 3.

As used herein, and unless otherwise specified, the term "about," when used in connection with a numeric value or range of values is to indicate that the value or range of values may deviate to an extent deemed reasonable to one of ordinary skill in the art. It is well known instrument variation and other factors can affect the numerical values. The term "about" is to accommodate these variations.

The term "substantially" as used herein is to accommodate the slight variations in which a particular component is attached to form the earpiece. For example, "substantially" as shown in any of the Figures is understood to accommodate the variation in which a cone may be attached to the body of an earpiece.

What is claimed is:

1. An earpiece comprising tip, retaining legs, body, and channel, wherein at least one of the tip, retaining legs, and body is made from a first composition comprising:
    E1, wherein E1 is an elastomer; and
    one or more phase change materials having a phase change ability from solid to liquid state at a predetermined phase-change temperature;
    wherein the phase change material comprises one or more C1 compounds enclosed in microspheres,
    wherein C1 is a saturated hydrocarbon, a fatty acid, or a polyether,
    wherein the composition has a hardness of 5 Shore A to 50 Shore A, and the amount of the phase change material in the composition is 10% to 40% by weight, and
    wherein the earpiece is substantially as shown in FIG. 1.

2. The earpiece of claim 1, wherein the composition has a hardness of 10 Shore A to 20 Shore A.

3. The earpiece of claim 1, wherein the amount of phase change material in the composition is 25% to 35% by weight.

4. The earpiece of claim 1, wherein C1 is a saturated hydrocarbon.

5. The earpiece of claim 4, wherein C1 is an n-alkane.

6. The earpiece of claim 5, wherein C1 is heptadecane, octadecane, nonadecane, icosane, or henicosane.

7. The earpiece of claim 5, wherein C1 is octadecane or icosane.

8. The earpiece of claim 1, wherein E1 is a thermoset rubber, thermoplastic elastomer, or a combination thereof.

9. The earpiece of claim 1, wherein E1 is a silicone rubber.

10. The earpiece of claim 1, wherein the phase-change temperature is 25° C. to 35° C.

11. The earpiece of claim 1, wherein the composition comprises two phase change materials having a phase change ability from solid to liquid state at different phase-change temperatures.

12. The earpiece of claim 1 further comprising one or more C2, wherein C2 is a material having an ability to provide one or more sensations upon contact with a person's skin.

13. The earpiece of claim 12 wherein the sensation is cooling, tingling, numbing, or soothing.

14. The earpiece of claim 1 wherein behind the tip is filled with a composition comprising:
E2, wherein E2 is an elastomer; and
one or more C3;
wherein C3 is a material having an ability to provide one or more sensations upon contact with a person's skin; and the composition has a hardness of 5 Shore A to 50 Shore A.

15. The earpiece of claim 1 wherein behind the tip is filled with a composition comprising:
E3, wherein E3 is an elastomer; and
one or more phase change materials having a phase change ability from solid to liquid state at a predetermined phase-change temperature;
wherein the amount of the phase change material in the composition is 40% to 70% by weight.

16. The earpiece of claim 12 wherein behind the tip is filled with a composition comprising:
E3, wherein E3 is an elastomer; and
one or more phase change materials having a phase change ability from solid to liquid state at a predetermined phase-change temperature;
wherein the amount of the phase change material in the composition is 40% to 70% by weight.

17. The earpiece of claim 1 having a cone made from and filled with a composition comprising E3, wherein E3 is an elastomer; and
one or more phase change materials having a phase change ability from solid to liquid state at a predetermined phase-change temperature;
wherein the amount of the phase change material in the composition is 40% to 70% by weight; and
wherein the cone is attached to the body of the earpiece substantially as shown in FIG. 3.

18. The earpiece of claim 1 having a cone made from and filled with a second composition comprising:
E1, wherein E1 is an elastomer; and
one or more phase change materials having a phase change ability from solid to liquid state at a predetermined phase-change temperature;
wherein the composition has a hardness of 5 Shore A to 50 Shore A, and the amount of the phase change material in the composition is 10% to 40% by weight;
wherein the predetermined phase-change temperature of the first composition is 32 ° C., the predetermined phase-change temperature of the second composition is 28 ° C., and the cone is attached to the body of the earpiece substantially as shown in FIG. 3.

19. A headphone having an earpiece of claim 1.

20. The earpiece of claim 1, wherein the earpiece is configured to absorb heat as an user's temperature rises and release heat as temperature cools.

21. The earpiece of claim 1, wherein the earpiece has the ability to reduce discomfort due to heat and pressure upon contact with an earpiece user's skin.

22. An earpiece comprising tip, retaining legs, body, and channel, wherein the tip, retaining legs, body, and channel are made from a composition comprising:
E3, wherein E3 is an elastomer; and
one or more phase change materials having a phase change ability from solid to liquid state at a predetermined phase-change temperature;
wherein the phase change material comprises one or more C1 compounds enclosed in microspheres,
wherein C1 is a saturated hydrocarbon, a fatty acid, or a polyether,
wherein the amount of the phase change material in the composition is 40% to 70% by weight, and
wherein the earpiece is substantially as shown in FIG. 1.

23. The earpiece of claim 22, wherein the amount of phase change material in the composition is 50% to 60% by weight.

24. The earpiece of claim 22, wherein the earpiece is configured to absorb heat as an user's temperature rises and release heat as temperature cools.

25. The earpiece of claim 22, wherein the earpiece has the ability to reduce discomfort due to heat and pressure upon contact with an earpiece user's skin.

* * * * *